Oct. 2, 1934.   J. M. HOTHERSALL   1,975,102
ORCHARD HEATER
Filed July 15, 1931   2 Sheets-Sheet 1
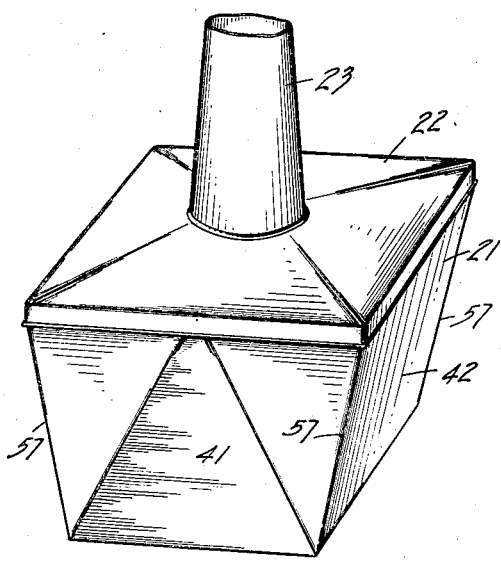
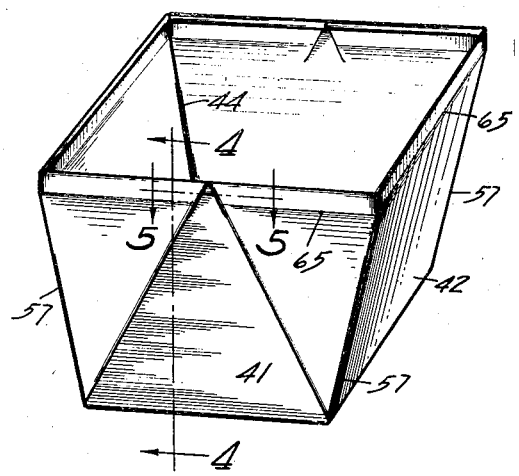
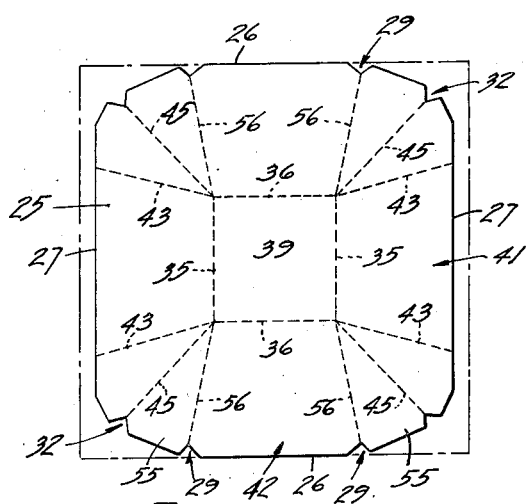
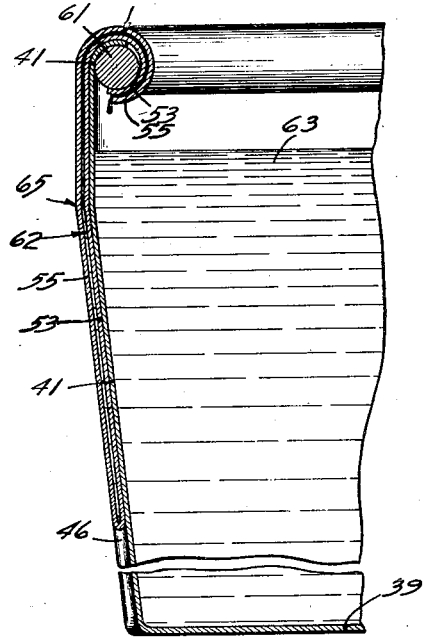
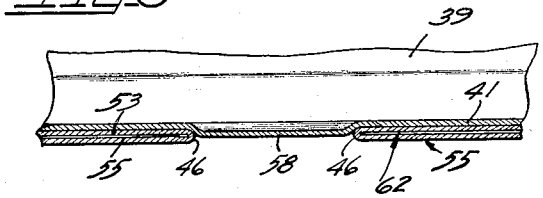
INVENTOR
John M. Hothersall
BY John C. Carpenter
ATTORNEY Oct. 2, 1934.  J. M. HOTHERSALL  1,975,102
ORCHARD HEATER
Filed July 15, 1931  2 Sheets-Sheet 2
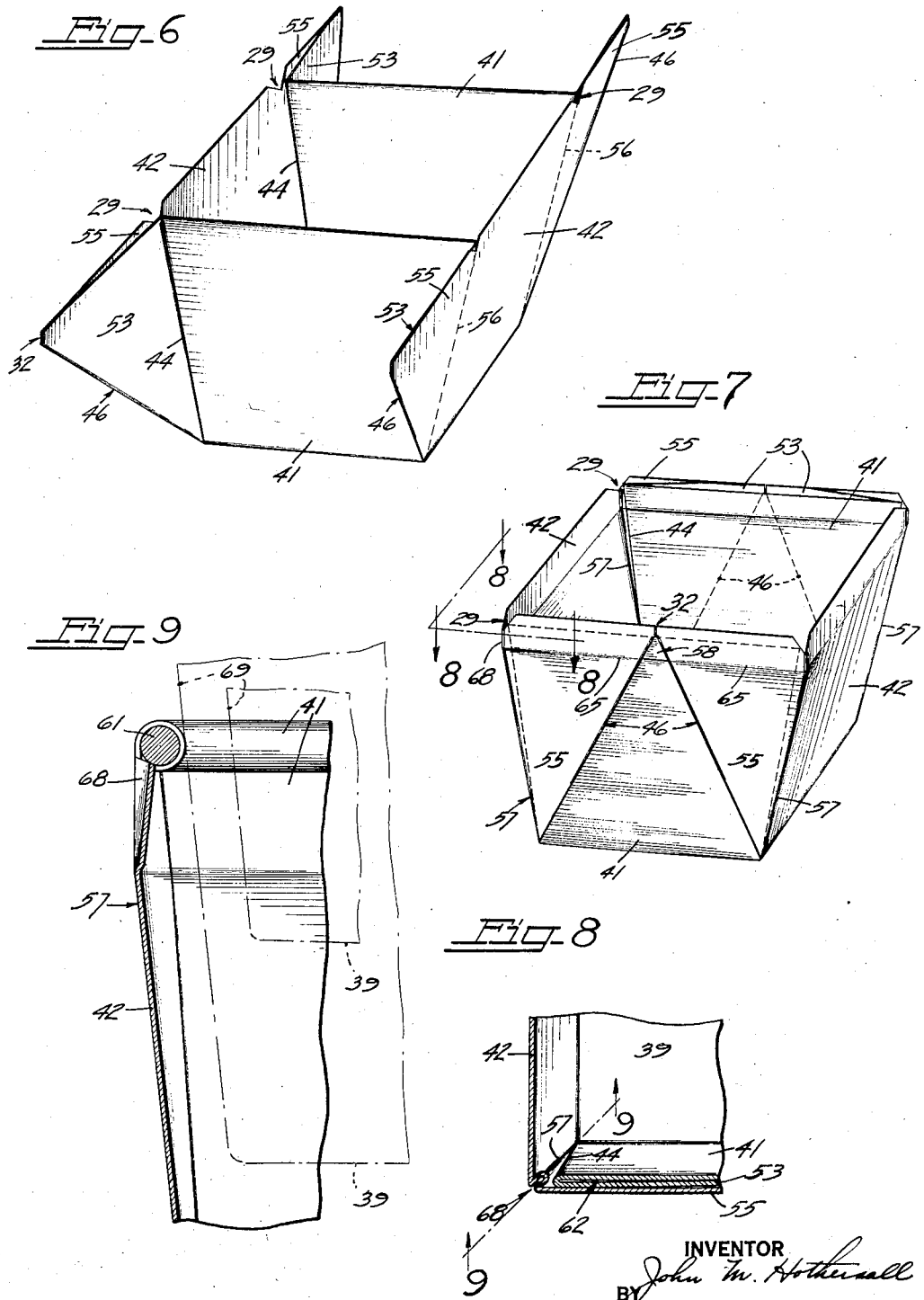

Patented Oct. 2, 1934

1,975,102

UNITED STATES PATENT OFFICE 1,975,102

ORCHARD HEATER

John M. Hothersall, Brooklyn, N. Y., assignor to American Can Company, New York, N. Y., a corporation of New Jersey Application July 15, 1931, Serial No. 550,954

10 Claims. (Cl. 158—91)

The present invention relates to an oil burning orchard heater and has particular reference to an improved folded construction of bowl or oil receptacle made from flat stock of sheet material. In the usual form of folded orchard heater bowl, of which there are several types, a great deal of difficulty has been experienced because the oil used as a fuel for the heater has been drawn up by capillary action along the inside of the side walls and between the folds and has oozed or seeped out over their top edges. As a result of this action, oil has spread along the outside walls of the bowl resulting in a dirty, messy exterior. This action has been particularly bad when the heater is out of use for long periods between firings.

The present invention is directed, particularly although not exclusively, to the overcoming of the disagreeable features of this capillary action and to the production of a cheap and efficient bowl construction which directs the flow of the oil back into the receptacle. This insures the keeping of the outer walls clean or free from oil and dirt and effects saving of the oil for the use for which it is intended.

The principal object, therefore, of the present invention is the provision of an improved orchard heater of simple construction and one having a folded bowl or oil receptacle so constructed as to prevent seepage of the oil contents onto the outside walls of the bowl.

A further important object of the invention is the provision of an orchard heater of this general character having a tapered rectangular one-piece bowl formed from a blank of sheet metal and so folded, bent and reinforced as to provide a straight-walled rigid seat for a tightly fitting cover.

Numerous other objects of the invention will be apparent as it is better understood from the following description, which, taken in connection with the accompanying drawings, discloses a preferred embodiment thereof.

Referring to the drawings:

Fig. 1 is a perspective view of a completely assembled orchard heater embodying the present invention;

Fig. 2 is a perspective view of the bowl or oil receptacle of such a heater;

Fig. 3 is a plan view of the blank from which the bowl is formed;

Fig. 4 is an enlarged transverse sectional view taken substantially along the line 4—4 in Fig. 2, parts being broken away;

Fig. 5 is an enlarged sectional detail taken substantially along the line 5—5 in Fig. 2;

Fig. 6 is a perspective view of the folded blank of the bowl or oil receptacle illustrating it in its first folded position;

Fig. 7 is a view similar to Fig. 6 illustrating a further folding step in the manufacture of the bowl;

Fig. 8 is an enlarged fragmentary plan detail taken substantially along a plane, the traces of which are indicated by the lines 8—8—8 in Fig. 2; and Fig. 9 is an enlarged transverse sectional detail taken through the corner of the oil receptacle along a plane the traces of which are indicated by the broken line 9—9 in Fig. 8.

For the purpose of exemplifying the present invention there is illustrated in the drawings a square or rectangular bowl 21 (Fig. 1) forming the oil receptacle for the heater and this bowl is provided with a cover 22 fitting on its upper end and supporting a typical central stack 23. Other supplemental parts and constructions may be provided as desired but these form no part of the present invention and will, therefore, be omitted from both the drawings and the description.

The bowl 21 is preferably formed from a blank 25 (Fig. 3) which has been cut from sheet metal. This blank after being cut is intended to be folded so that a square bottom 39 and tapered outwardly inclined end walls 41 and side walls 42 are provided. The major folding is accomplished along the lines 35 and 36 at the bottom and along the lines 43 and 56 at the sides. The parts of the blank between each line 43 and its adjacent or intersecting line 56 are folded along lines 45 to form outwardly extending corner folds adapted to be bent first into flat contact (Fig. 6) and then to be folded over onto the end walls 41 (Fig. 7).

In the first folded position, illustrated in Fig. 6, there are thus provided outer corner edges 46 (along the fold lines 45) and inner corner edges 44 (along the fold lines 43). Four inner triangular wall sections 53 result, each being bounded on its two sides by its intersecting corner edges 44, 46.

When the corner folds including these triangular sections are folded over to provide the shape of Fig. 7, outer corner bowl edges 57 (adjacent fold lines 56) are produced and four outer triangular wall sections 55 are formed. These wall sections 55, bounded on their sides by the intersecting corner edges 46, 57 are close to the corresponding inner wall sections 53 and the inner and outer sections together constitute the corner folds previously referred to.

Notches 29 are cut in the blank 25 at the ends of the fold lines 56 (Fig. 7) and allow for free inward bending of the upper edges of the bowl over a reinforcing wire 61. Similar notches 32 cut in the blank at the ends of the fold lines 45 are for a like purpose, the latter also allowing abutment of the two folded-in triangular sections 53, 55 which extend along each end wall 41.

This bending of the bowl edges over a reinforcing wire will be hereinafter fully explained, but at this time attention is directed to the blank of Fig. 3. Those sections of the blank which provide the end walls 41 of the folded bowl are less in extent than the sections providing the side walls 42. In other words the area of the sheet entering the end walls is confined between the parallel lines 27, 35 while the side walls require the greater area as defined between the lines 26, 36.

The resulting shorter height of the end walls 41 allows a closer bending of the parts around the reinforcing wire and also effects a saving of material. The square dot and dash outline surrounding the blank graphically illustrates such a material saving by showing the increased size of blank sheets which would be necessary if the end and side walls were of equal height. This will be more apparent as the description proceeds.

Each end wall 41 just beneath the abutments of the two corner folds is preferably pressed outwardly at 58 (Figs. 5 and 7) to provide a more even outer surface along the upper edges of the three layers of wall sections 41, 53, 55. This is done to provide a seat for a cover member which is applied to the bowl after it has been bent around its reinforcing wire.

It will be observed by reference to Figs. 7 and 9 that the inner corner edges 44 on opposite sides of each end 41 do not coincide with the outer corner bowl edges 57 but are spaced a slight distance inwardly. This is to further assist in the formation of a cover seat for the bowl, the upper part of the bowl adjacent the notches 29 being puckered inwardly at 68 (see also Fig. 8). By means of the puckers 68 the upper parts of the tapered sections of the bowl are brought into vertical planes, the wall parts 41, 42 and 55 being bent slightly along a horizontal line 65. Such a vertical wall structure provides an improved friction seat for the cover member 22.

The bowl folded into the form illustrated in Fig. 7, is in condition to receive the reinforcing wire 61 which is placed inside of the upper edge of the bowl and is pushed downwardly until the wire is in a horizontal plane just below the corner notches 29. The upper peripheral edges of the side walls 41, 42 and also the upper edges of the walls 53, 55 of the corner members are now bent inwardly over the wire 61 (Figs. 4 and 8). The upper edges of the end members 41 in their bent and wire encircling position terminate on the upper side of the wire 61 (Fig. 4), these ends being shorter or of less height than the other bowl walls, as previously explained in connection with the cut blank.

The terminal edges of the walls 53, 55 in curled position, fully encircle the curled edges of the shorter ends 41 and further extend inwardly and downwardly to a position beneath the reinforcing wire 61. In a similar manner the terminal edges of the side walls 42 in their curled position also extend inwardly and downwardly and terminate in a similar position beneath the underside of the reinforcing wire.

The walls 53, 55 of the triangular corner fold members while lying substantially in close contact one with the other are in reality slightly separated by a relatively small space, indicated in Figs. 4 and 5 by the numeral 62. It is within this space that the oil flows under the capillary action previously referred to. It has been found to be commercially impossible to so fold the walls 53, 55 so as to obviate this space.

In the present invention the positioning of ends of the bowl walls inwardly over the reinforcing wire is of such a nature as to have the oil space 62 extend into communication with the interior of the bowl, both adjacent the corners 57 and also beneath the wire. In other words, this space 62 communicates along the bowl corners with the oil, designated by the numeral 63, used in the heater. Under the capillary action referred to, this oil freely passes into the spaces 62 and is drawn upwardly between the walls 53, 55 passing around the tubular edges of the walls as they encircle the reinforcing wire 61. This upper terminal of the space coming directly beneath the reinforcing wire 61 is entirely inside of the bowl and the oil which moves upwardly and over the bent edges of the bowl parts accumulates along the terminal edges of the walls. This oil eventually drips back into the oil mass in the bowl and none is allowed to escape to its outside.

The finished bowl, as illustrated in Figs. 2 and 4, has a smooth upper edge and is very rigid owing to the reinforcement of the wire 61. At the same time the exterior walls of the bowl above the line of bend 65 presents a smooth vertical surface for frictional contact with the flange of the cover 22. In this manner the advantages of a straight side bowl are had for connection with the cover together with the tapered shape of the bowl.

The construction just described provides a simple and efficient folded bowl for an orchard heater having all of the advantages of a drawn construction, together with cheapness of manufacture and in addition, the added advantage of cleanliness while providing tight frictional contact between cover and bowl. Such a construction also allows for economical shipment by nesting of the bowls one inside of the other, as indicated by the broken lines 69 (Fig. 8). These broken lines merely indicate the outer wall outlines of other bowls so nested. Since there is only a line contact between the nested bowls they are easily separated from each other after shipment.

Air for combustion is to be supplied by a damper at any suitable point above the level of the fuel oil, as is well known in orchard heaters.

It is thought that the invention and many of its attendant advantages will be understood from the foregoing description, and it will be apparent that various changes may be made in the form, construction and arrangement of the parts, without departing from the spirit and scope of the invention or sacrificing all of its material advantages, the form hereinbefore described being merely a preferred embodiment thereof.

I claim:

1. An orchard heater for fuel oil, comprising a receptacle base, tapered side walls extending upwardly and outwardly from said base, corner members therebetween, each member connecting adjacent side walls and being folded back on itself and bent along a corner of the receptacle to lie closely adjacent a said side wall, said corner members and intermediate side walls at their top peripheral edges being puckered interiorly in the receptacle corners to provide exteriorly smooth vertical walls at the top of the receptacle, and a cover adapted to tightly fit said vertical walls to partially close the receptacle.

2. An orchard heater for fuel oil, comprising a receptacle base, tapered side walls extending upwardly and outwardly from said base, corner members therebetween, each member connecting adjacent side walls and being folded back on itself and bent along a corner of the receptacle to lie closely adjacent a said side wall, a reinforcing wire located inside of said walls, said corner members and intermediate side walls at their top peripheral edges being bent over said wire and being puckered interiorly in the receptacle corners to provide exteriorly smooth vertical walls at the top of the receptacle, and a cover tightly fitting said vertical walls and partially closing the receptacle.

3. An orchard heater for fuel oil, comprising a receptacle base, tapered side walls extending upwardly and outwardly from said base, corner members therebetween, each member connecting adjacent side walls and being folded back on itself and bent along a corner of the receptacle to lie closely adjacent a said side wall, said corner members and intermediate side walls at their top peripheral edges being puckered inwardly in the receptacle corners to provide exteriorly smooth vertical walls at the top of the receptacle, a cover adapted to tightly fit said vertical walls to partially close the receptacle, and a stack fitting on said cover and providing a discharge opening for the heater.

4. An orchard heater for fuel oil, comprising a receptacle base, tapered side walls extending upwardly and outwardly from said base, corner members therebetween, each member connecting adjacent side walls and being folded back on itself and bent along a corner of the receptacle to lie closely adjacent a said side wall, a reinforcing wire located inside of said walls, said corner members and said side walls having their top peripheral edges bent inwardly and over said wire to reinforce the receptacle edge and to direct the oil, raised by capillary action within said folded corner members, into the interior of the receptacle, said corner members and intermediate side walls adjacent said reinforcing wire being also bent into vertically extending walls, and a cover adapted to tightly engage said vertical walls.

5. An orchard heater receptacle for fuel oil, comprising a rectangular base, side walls extending upwardly from said base and having folded corner members, and a reinforcing wire located inside of said walls and said corner members, said walls and corner members having their top peripheral edges bent inwardly and permanently over said wire to reinforce the receptacle edge and to direct the oil, raised by capillary action within said folded corner members, into the interior of the receptacle.

6. A one-piece orchard heater receptacle for fuel oil, comprising a substantially square base, tapered side walls extending upwardly and outwardly from said base and having triangular folded corner members connecting said side walls, and a reinforcing wire located inside of said walls and said corner members, said walls and corner members having their top peripheral edges bent inwardly and permanently over said wire to reinforce the receptacle edge and to direct the oil, raised by capillary action within said folded corner members, into the interior of the receptacle.

7. In an orchard heater, the combination of a square, one-piece receptacle formed from an oblong rectangular blank of sheet material, said blank being folded along lines parallel to its edges to provide a square base and being further folded along diagonal corner lines to provide tapered side walls and folded corner members, the latter being positioned closely adjacent and outside of the shorter of said side walls, the upper edges of said side walls and corner members being curled inwardly with the shorter of said side walls on the inside of the said corner members, and a square cover adapted to tightly engage said upper curled edges.

8. In an orchard heater, the combination of a square, one-piece receptacle formed from an oblong rectangular blank of sheet material, said blank being folded along lines parallel to its edges to provide a square base and being further folded along diagonal corner lines to provide tapered side walls and folded corner members, the latter being positioned closely adjacent and outside of the shorter of said side walls, a reinforcing wire located inside of said receptacle, the upper edges of said side walls and corner members being curled inwardly around said wire with the shorter of said side walls on the inside of the said corner members, and a square cover adapted to tightly engage said upper curled edges.

9. A receptacle for orchard heaters and for the combustion of fuel therein, the same being formed of a single folded sheet of metal, forming longer side walls and shorter end walls, said sheet having corner parts between the side and end walls folded on to the outside of the said shorter walls, said receptacle having an inwardly curled rim formed by the upper parts of said side and end walls and folded corner parts.

10. A receptacle for orchard heaters and for the combustion of fuel therein, the same being formed of a single folded sheet of metal, forming side and end walls and corner parts folded down on the outside of the receptacle, said receptacle having an inwardly curled rim formed of the upper parts of said side and end walls and corner parts, and a wire arranged within said curled rim and enclosed by the top edges of said side walls, and underlapping end walls and overlapping corner parts.

JOHN M. HOTHERSALL.